United States Patent
Hawilo et al.

(10) Patent No.: US 10,540,211 B2
(45) Date of Patent: Jan. 21, 2020

(54) ELASTICITY FOR HIGHLY AVAILABLE APPLICATIONS

(71) Applicants: Hassan Hawilo, London (CA); Ali Kanso, Elmsford, NY (US); TELEFONAKTIEBOLAGET LM ERICSSON (PUBL), Stockholm (SE)

(72) Inventors: Hassan Hawilo, London (CA); Ali Kanso, Elmsford, NY (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/551,855

(22) PCT Filed: Nov. 13, 2015

(86) PCT No.: PCT/IB2015/058804
§ 371 (c)(1),
(2) Date: Aug. 17, 2017

(87) PCT Pub. No.: WO2016/075671
PCT Pub. Date: May 19, 2016

(65) Prior Publication Data
US 2018/0067778 A1  Mar. 8, 2018

Related U.S. Application Data

(60) Provisional application No. 62/118,927, filed on Feb. 20, 2015.

(30) Foreign Application Priority Data

Nov. 13, 2014 (WO) .................. PCT/IB2014/066021

(51) Int. Cl.
*G06F 9/50* (2006.01)

(52) U.S. Cl.
CPC ............ *G06F 9/5066* (2013.01); *G06F 9/505* (2013.01); *G06F 9/5033* (2013.01); *G06F 2209/508* (2013.01)

(58) Field of Classification Search
None
See application file for complete search history.

(56) References Cited

U.S. PATENT DOCUMENTS

2006/0069776 A1  3/2006 Shim et al.
2010/0011102 A1* 1/2010 Dasgupta .............. G06F 9/5066
                                                                709/226

(Continued)

FOREIGN PATENT DOCUMENTS

EP       0 767 585 A2    4/1997
WO    2006/002659 A1    1/2006

OTHER PUBLICATIONS

McCue et al., Computing Replica Placement in Distributed Systems, 1992, IEEE, IEEE Second Workshop on Replicated Data, 1992, p. 58-61 (Year: 1992).*

(Continued)

*Primary Examiner* — Shih-Wei Kraft
(74) *Attorney, Agent, or Firm* — Ericsson Inc.

(57) ABSTRACT

Cloud computing is continuously growing as a business model for hosting information and communications technology applications. While the on-demand resource consumption and faster deployment time make this model appealing for the enterprise, other concerns arise regarding the quality of service offered by the cloud. The placement strategy of the virtual machines hosting the applications has a tremendous effect on the High Availability of the services provided by these applications hosted in the cloud. Systems and methods for scaling a virtualized application that take into consideration the interdependencies between the com- (Continued)

ponents of the applications and other constraints such as the communication delay tolerance and resource utilization are provided.

17 Claims, 10 Drawing Sheets

(56) References Cited

U.S. PATENT DOCUMENTS

| | | | |
|---|---|---|---|
| 2010/0325281 A1* | 12/2010 | Li | G06F 17/30575 709/226 |
| 2011/0055426 A1* | 3/2011 | Lakshmanan | G06F 9/5066 709/242 |
| 2013/0013781 A1* | 1/2013 | Levenshteyn | H04L 67/1008 709/226 |
| 2013/0166752 A1* | 6/2013 | Kim | G06F 9/5061 709/226 |
| 2013/0191519 A1* | 7/2013 | Chang | G06F 9/5066 709/223 |
| 2013/0298135 A1* | 11/2013 | Hiltunen | G06F 11/008 718/104 |
| 2014/0101300 A1* | 4/2014 | Rosensweig | G06F 9/5072 709/223 |
| 2014/0278326 A1* | 9/2014 | Sharma | G06F 8/60 703/13 |
| 2014/0282581 A1* | 9/2014 | Vonteddu | G06F 9/5011 718/104 |

OTHER PUBLICATIONS

Karlsson et al., Do We Need Replica Placement Algorithms in Content Delivery Networks, 2002, WCW, International Workshop on Web Content Caching and Distirbution, 12 pages (Year: 2002).*
Agarwal et al., Volley: Automated Data Placement for Geo-Distributed Cloud Services, 2010, Microsoft, 16 pages (Year: 2010).*
International Search Report for PCT/IB2015/058804, dated Feb. 15, 2016; 6 pages.

* cited by examiner

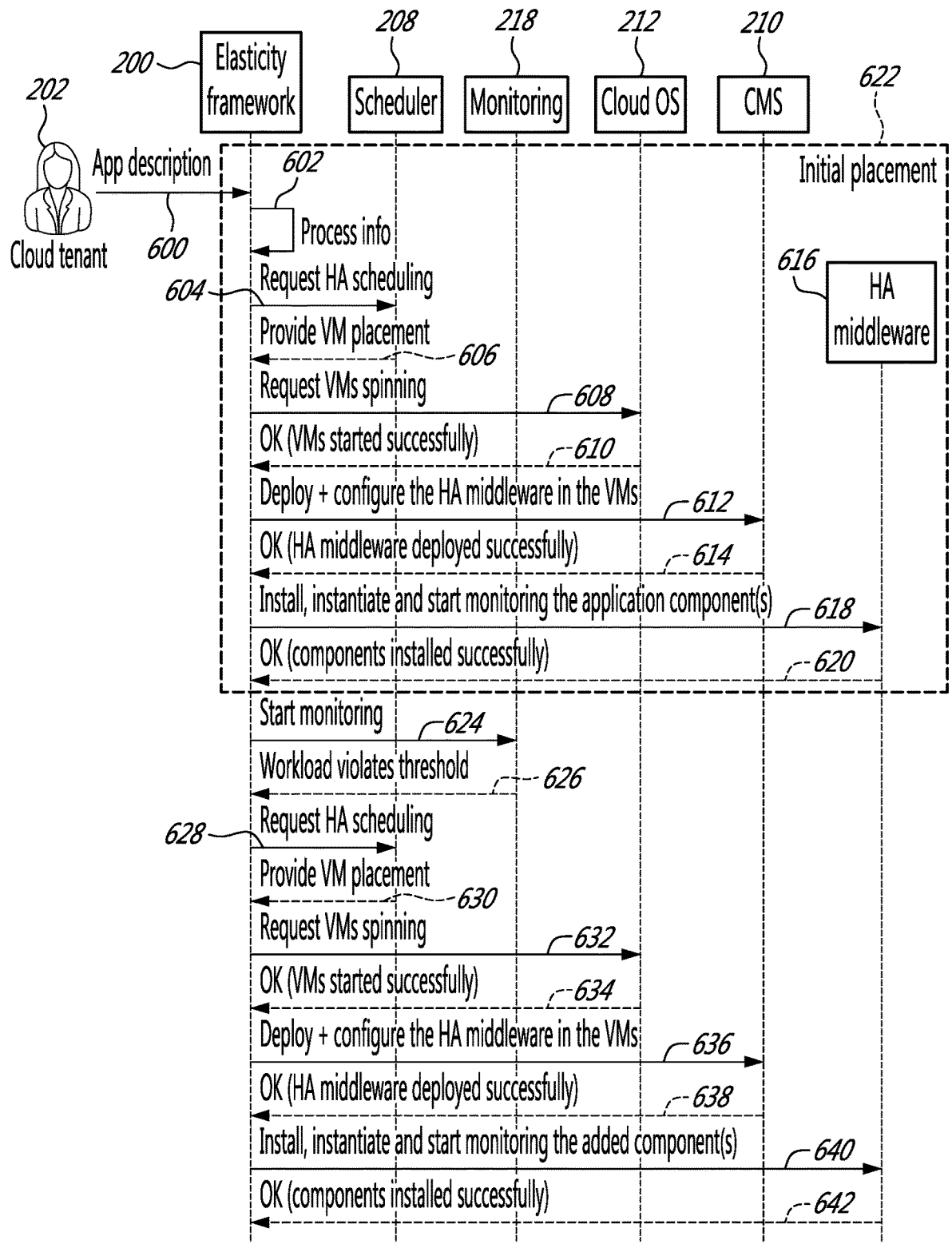

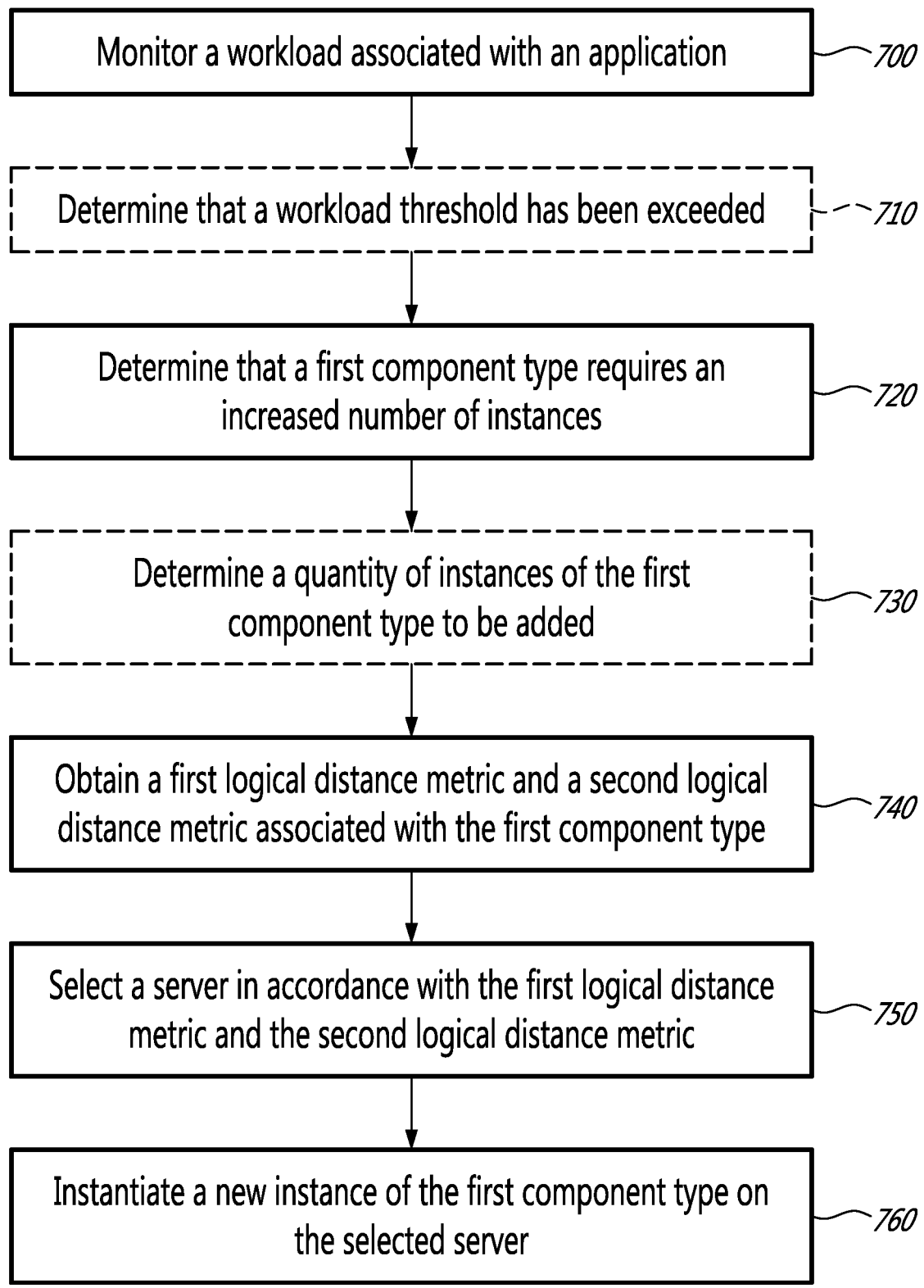

ELASTICITY FOR HIGHLY AVAILABLE APPLICATIONS

CROSS REFERENCE TO RELATED APPLICATIONS

This application claims the benefit of priority to previously filed PCT Patent Application Number PCT/IB2014/066021 entitled "COMPONENT HIGH AVAILABILITY SCHEDULER" and filed on Nov. 13, 2014 and previously filed U.S. Provisional Patent Application No. 62/118,927 entitled "ELASTICITY FOR HIGHLY AVAILABLE APPLICATIONS" and filed on Feb. 20, 2015, the contents of which are incorporated herein by reference.

TECHNICAL FIELD

This disclosure relates generally to systems and methods for placing virtual machines on servers in a cloud computing environment.

BACKGROUND

Recently, the cloud has become the lifeblood of many telecommunication network services and information technology (IT) software applications. With the development of the cloud market, cloud computing can be seen as an opportunity for information and communications technology (ICT) companies to deliver communication and IT services over any fixed or mobile network, high performance and secure end-to-end quality of service (QoS) for end users. Although cloud computing provides benefits to different players in its ecosystem and makes services available anytime, anywhere and in any context, other concerns arise regarding the performance and the quality of services offered by the cloud.

One area of concern is the High Availability (HA) of the applications hosted in the cloud. Since these applications are hosted by virtual machines (VMs) residing on physical servers, their availability depends on that of the hosting servers. When a hosting server fails, its VMs, as well as their applications become inoperative.

The Service Availability Forum (SAForum), a consortium of telecommunication and IT companies, has created standards for high availability systems. The SAForum has defined standards to leverage HA systems on commercial off-the-shelf (COTS) equipment. Enabling HA systems on standard IT platforms of different architectures such as x86, ARM, and ATCA maintains the portability and interoperability of HA application across various standard compliant platforms. More specifically, the SAForum defines standards and guidelines for the design of an HA middleware that manages the availability of the services provided by an application. It aims to achieve the desired application's availability through the management of redundant components and by seamlessly swapping a faulty component workload to a redundant component upon detecting a failure.

The SAForum middleware provides several services including the availability management framework (AMF) responsible for monitoring the application's components and orchestrating their recoveries, and the software management framework (SMF) responsible for carrying software upgrades supporting the automated rolling upgrade that allows the incremental upgrade of the applications components. Also, it minimizes the downtime by synchronizing with the AMF. The AMF can leverage the redundant replicas of a given component by dynamically switching over the workloads to the upgraded replicas while the old-versioned replica is being upgraded. The applications that integrate with the SAForum middleware can also benefit from other services such as distributed messaging, checkpointing, logging and other services. The OpenSAF project is an open source HA middleware implementation of the SAForum standards.

The conventional HA middleware was not developed for the cloud environment, but rather for static deployments within a data center.

The promise of having a simplified IT infrastructure and an on-demand provisioning model is a key feature that enabled the adoption of cloud computing by the enterprise. From the perspective of a cloud provider that offers infrastructure as a service (IaaS), elasticity can be considered both a cloud feature and a service. Elasticity is a cloud feature in that it allows the cloud itself to absorb the addition or removal of physical resources in a transparent manner. Elasticity is a cloud service offered to the cloud tenants that allows the virtual resources allocated to their applications to grow and shrink in proportion to the runtime demand. On the other hand, from a cloud tenant perspective, the elasticity service offered by the provider becomes a feature of their cloud deployed application(s). FIG. 1 illustrates the different perspectives of a cloud tenant vs a cloud provider.

Another factor that is often neglected in elastic cloud deployments is the dynamic HA-aware scheduling for the addition and removal of the VMs hosting the application's components. Deploying replicated components in different servers, racks, data-centers can protect against larger failure scopes, however it should also take into consideration the functional (e.g. colocation dependencies for shared libraries, delay tolerance among dependent components, etc.) and non-functional requirements such as HA.

A comprehensive elasticity solution should consider the HA-aware scheduling of any added/removed VMs, the dynamic deployment of the middleware managing the availability of the applications, and the runtime addition/removal of the application instances without service interruption.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for scaling an application. The method can be performed by a cloud manager or scheduler device. The method includes monitoring a workload associated with an application comprising a plurality of component types and at least one deployed instance of each of the component types. It is determined that a first component type requires an increased number of instances. A first logical distance metric defining a maximum allowable network delay between instances of the first component type is obtained. A second logical distance metric defining a maximum allowable network delay between an instance of the first component type and an instance of a second component type is obtained. A server is selected in accordance with at least the first logical distance metric and the second logical distance metric. A new instance of the first component type is instantiated on the selected server.

In another aspect of the present invention, there is provided a cloud manager comprising circuitry including a processor and a memory. The memory contains instructions executable by the processor whereby the cloud manager is operative to monitor a workload associated with an application, the application comprising a plurality of component types and at least one deployed instance of each of the component types. The cloud manager is operative to determine that a first component type requires an increased number of instances. The cloud manager is operative to obtain a first logical distance metric defining a maximum allowable network delay between instances of the first component type and a second logical distance metric defining a maximum allowable network delay between an instance of the first component type and an instance of a second component type. The cloud manager is operative to select a server in accordance with at least the first logical distance metric and the second logical distance metric. The cloud manager is operative to instantiate a new instance of the first component type on the selected server.

In another aspect of the present invention, there is provided a cloud manager node comprising a workload monitoring module, a distance metric module, a selection module and a placement module. The workload monitoring module is configured for monitoring a workload associated with an application, the application comprising a plurality of component types and at least one deployed instance of each of the component types, and for determining that a first component type requires an increased number of instances. The distance metric module is configured for obtaining a first logical distance metric defining a maximum allowable network delay between instances of the first component type and a second logical distance metric defining a maximum allowable network delay between an instance of the first component type and an instance of a second component type. The selection module is configured for selecting a server in accordance with at least the first logical distance metric and the second logical distance metric. The placement module is configured for instantiating a new instance of the first component type on the selected server.

In some embodiments, determining that the first component type requires an increased number of instances is in response to determining that a workload threshold has been exceed. A quantity of instances of the first component type to be added can be determined in accordance with the monitored workload.

In some embodiments, dependencies can be identified between the deployed instances of each of the component types and the new instance of the first component type to be added.

In some embodiments, the maximum allowable network delay between instances of the first component type can be determined at least in part based on a connectivity requirement between instances of a same component type. The maximum allowable network delay between the instance of the first component type and the instance of the second component type can be determined at least in part based on a connectivity requirement between instances of different component types.

In some embodiments, a network zone for server selection can be determined in accordance with the first logical distance metric and the second logical distance metric.

In some embodiments, a server can be selected further in accordance with maximizing an availability of the application. Maximizing the availability of the application can include at least one of minimizing a frequency of failure of the application and/or minimizing an impact of failure on the application. A server can be selected in accordance with at least one of a mean time to failure parameter associated with the server and/or a mean time to recovery parameter associated with the server. In some embodiments, the server can be selected from a list of candidate servers.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 7 is a signaling diagram illustrating an elasticity framework workflow;

FIG. 8 is a flow chart illustrating a method for scaling a highly available application;

DETAILED DESCRIPTION

Figure 1:
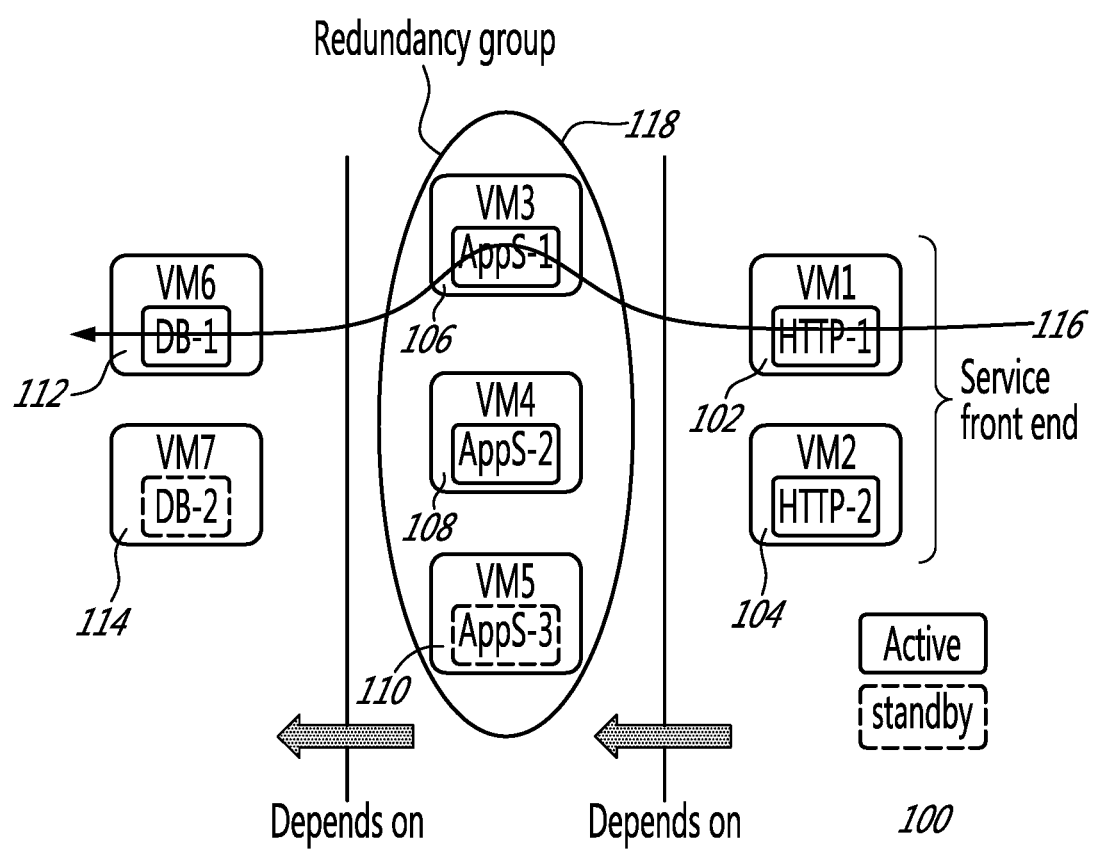
FIG. 1 illustrates an example application deployment in the cloud.

Reference may be made below to specific elements, numbered in accordance with the attached figures. The discussion below should be taken to be exemplary in nature, and not as limiting of the scope of the present invention. The scope of the present disclosure is defined in the claims, and should not be considered as limited by the implementation details described below, which as one skilled in the art will appreciate, can be modified by replacing elements with equivalent functional elements.

Embodiments of the present disclosure propose a scheduling and scaling technique that takes into consideration capacity constraints, network delay demands, interdependencies and redundancies between an application's components. The placement strategy of applications can affect the availability of the services provided by virtualized cloud applications to their end users.

It is noted that the terminology of application/component/ virtual machine "scheduling" and "placement" are well understood in the art as being synonymous with one another. This terminology will be used interchangeably herein as it relates to selecting a host server for a virtual machine to be placed on.

Some embodiments disclosed herein are directed towards capturing the constraints that can affect the application placement including capacity constraints, network communication delay and availability constraints. Some embodiments disclosed herein reflect the availability constraints not only by the failure rates of applications' components and the scheduled servers, but also by the functionality requirements, to generate co-location and anti-location constraints. Some embodiments disclosed herein consider the different interdependencies and redundancy relationships between an application's components. Some embodiments disclosed herein examine multiple failure scopes that may affect the component itself, its execution environment, and/or its dependent components. Some embodiments disclosed herein introduce an application's component "criticality" concept to the approach. A criticality-based analysis that ranks components of an application according to their criticality can be used to ensure that most critical components are given higher scheduling priorities.

It is noted that an application, as will be referred to herein, is composed of at least one component, which can be configured in at most one application. An application can combine the functionalities of multiple component types to provide a higher level service. In order to maintain availability requirements, each component type can have one or more active components and one or more associated redundant components. The primary component and its redundant ones can be grouped into a dynamic redundancy group. In that group, each component can be assigned specific number of active and standby redundant components.

Each component can be configured to depend on other components. The dependency relationship between different component types can be defined using the delay tolerance, outage tolerance and/or communication bandwidth attributes. The delay tolerance defines the maximum latency allowed to maintain a communication between sponsor and dependent components. The outage tolerance, or tolerance time, is the amount of time a dependent component can tolerate without the sponsor component.

A similar association can be used to describe the requirements between active or redundant component of the same type that may need to synchronize their states. For example, the delay tolerance can define the maximum allowable latency to maintain a connection between an active component and its redundant component(s).

At the infrastructure-as-a-service (IaaS) level, a cloud provider or operator may provide a certain level of availability of the VMs assigned to the tenant(s). However, this may not necessarily guarantee the HA of the applications deployed in those VMs. In fact, the tenants would have to deploy their applications in an HA manner whereby redundant standby components can take over the workload when a VM or a server fails. Such a virtualized application can be comprised of a number of components having interdependencies.

To illustrate this point, consider the example of a multi-tiered HA web-server application consisting of three component types: (1) the front end HTTP servers, (2) the Application servers, and (3) the databases. The HTTP servers handle static user requests and forward the dynamic ones to the Application servers that dynamically generate HTML content. The users' information is stored at the back end databases.

FIG. 1 illustrates an exemplary HA-aware deployment of the example web-server application 100. At the front end, there are two active (stateless) HTTP servers deployed on VM1 102 and VM2 104, sharing the load of requests, where if one fails the other would serve its workload. In practice, this could incur performance degradation. The (stateful) Application server has a 2+1 redundancy model with one standby (on VM5 110) backing up the two active Application servers (on VM3 106 and VM4 108). At the back end, there is one active database (on VM6 112) serving all of the requests that is backed up by one standby database (on VM7 114). Functional dependency clearly exists amongst the different component types.

The notion of a "computational path" (or data path) is defined as the path that a user request must follow through a chain of dependent components until its successful completion. For instance, in order for dynamic request to be processed, at least one active HTTP server, App server, and database must be healthy. Such an example of a computational path 116 is shown in FIG. 1 as traversing VM1 102->VM3 106->VM6 112.

The components deployed in a redundant manner form a redundancy group. For example, for the Application server component type, redundancy group 118 is illustrated. Each component can have a different "impact" on the overall application depending on how many active replica(s) it has. For instance, as there is only one active instance of the database (VM6 112), its failure would impact all incoming requests. This would give the database a higher impact than the Application server, for example.

Cloud schedulers or managers that are agnostic of the intricacies of a tenant's application may result in sub-optimal placements, where redundant components may be placed too close to each other, rendering their existence obsolete as a single failure could affect them all. Or further, the connectivity constraints could be violated and hinder the overall functionality of the application. HA-aware scheduling in the cloud can consider both the details of the applications as well as the details of the cloud infrastructure.

The concept of elasticity (e.g. the scaling up or down of an application) spans across the multiple layers of the cloud. Hence a comprehensive elasticity solution should consider all the cloud layers. In some embodiments of the present disclosure, the issue of elasticity can be targeted from a tenant's perspective. Some tenant applications can require high availability to the magnitude of "five nines" (99.999%), allowing only for roughly five minutes of downtime per year including maintenance and upgrade. However, some cloud providers offer a service level agreement that only guarantees a lower HA level (99.95%), which leaves room for several hours of outages per year. Such outages can potentially entail direct monetary losses in addition to the reputation damage. Some cloud tenants can thrive at maintaining the high availability of their applications by leveraging the HA enabling features of the cloud provider (e.g. elastic load balancing). In addition, they can add their own application specific components to complement the cloud provider's HA solution.

Examples of such applications are cloud-fitted applications composed of stateless components that can be deployed behind redundant load balancers while the system state is maintained in a replicated, distributed storage. Nevertheless, not all business critical applications are cloud-fitted or were conceived for the cloud. In that sense, they can be considered legacy applications for the cloud. Such applications have typically been deployed in a data center (DC) and their high availability can be maintained by the specialized HA clustering solutions (e.g. HA middleware) responsible for monitoring the application's components and reacting to their failures, as have been described herein.

Such solutions can ensure an availability level (e.g. of fives nines) of the applications due to the fast recovery and frequent heartbeat monitoring. However, with this efficiency comes rigidity and complexity. When deployed in a virtual DC of interconnected VMs that can grow and shrink on demand, a static middleware deployment may not be able to cope with such dynamic changes, which can destabilize the HA status of an application.

The OpenSAF system architecture has defined two node types in an HA cluster. The System controller node hosts the different OpenSAF centralized functions and acts as a management entry point for the whole cluster. The payload node hosts the OpenSAF agents monitoring and maintaining the HA of the application's components. The deployment process consists of several steps that must be followed for a successful admission of a newly added node to the Open-SAF cluster. Such steps include the configuration of the installations and code compilation including the installation of all the prerequisites packages and copying the OpenSAF files to the designated location on the system. Thereafter, the system administrator defines the services of OpenSAF to be installed and the procedure of their configuration. For instance, the administrator defines the protocol (e.g. TCP/IP) to be used for the message distribution service (MDS). MDS is a non-standard service that provides the inter-process communication infrastructure within different OpenSAF nodes and services. The system admin would then apply the node specific configuration, such as specifying the node slot ID and IP address, which should be used during communication between the nodes. Finally, the information model management (IMM) configurations can be configured and modified to reflect the desired OpenSAF cluster architecture.

Applying all of these steps on each node can be a challenging process. The system integrator deploying Open-SAF has to synchronize the configuration files between the cluster nodes and assign a unique name and slot ID for each node. Reducing the time and the complexity of deploying OpenSAF, and eliminating possibility for errors is needed in a dynamic cloud setting. The SMF framework, while it is efficient for the upgrade of the applications, it cannot upgrade the middleware itself. Development and operation (DevOps) tools can ease and facilitate the automated deployment and configuration of software applications. Puppet labs and Chef are examples of highly adopted IT configuration management systems. Such configuration tools apply the system changes based on static manifests or "cookbooks" that are not intended for dynamic deployments where the configuration attributes (such as IP address and node names/IDs) are assigned at runtime. Extensions may be required for using such CMS tools.

Cloud applications typically have a multi-tier architecture serving a broad range of users. The placement of the application's components can have a significant impact on its availability. For example, redundant instances of a database may be desired to be placed as far apart as possible. The instances can be placed in different availability zones to avoid losing multiple instances in a single zone failure. Nevertheless, those database instances would be serving requests from dependent components with a constrained latency in terms of delay tolerance. Hence, placing the database in such a way to maximize the availability irrespective of its dependent components may yield to suboptimal results. Techniques for HA-aware scheduling for cloud applications can be employed to mitigate this issue.

As discussed, the placement of redundant deployments target the elimination of a single point of failure caused at the level of VM, cluster, or datacenter by utilizing geographically-distributed data centers to deploy new components. Yet, a similar issue exists when implementing an elasticity framework. The location of any newly added components (e.g. when scaling up), but also components that are removed (e.g. when scaling down), need to be carefully selected and placed as these choices can impact the overall availability of the application. Moreover, the solution space can be more constrained in this case because it is not an initial deployment, but a variation of an existing deployment. Therefore, there is a need for an elastic HA-aware scheduler to be defined and integrated with the elasticity framework.

Some embodiments of the present disclosure target elasticity from the cloud tenant perspective. In order to achieve elasticity for the tenant's highly available applications, all three levels: (1) the infrastructure, (2) the platform, (3) and the application software should be elastic in response to the variation of runtime workload. In reality, the visibility and control associated with each of these can be decoupled. The elasticity framework relies on different entities to define a comprehensive, elastic HA solution. The framework includes requirements such as having visibility to the cloud infrastructure in terms of the different availability zones, and the communication latency between zones, as well as the ability to monitor the runtime workload. Hence, it can either be managed by the cloud provider or by the tenant itself, if the cloud provider exposes this information.

Figure 2:
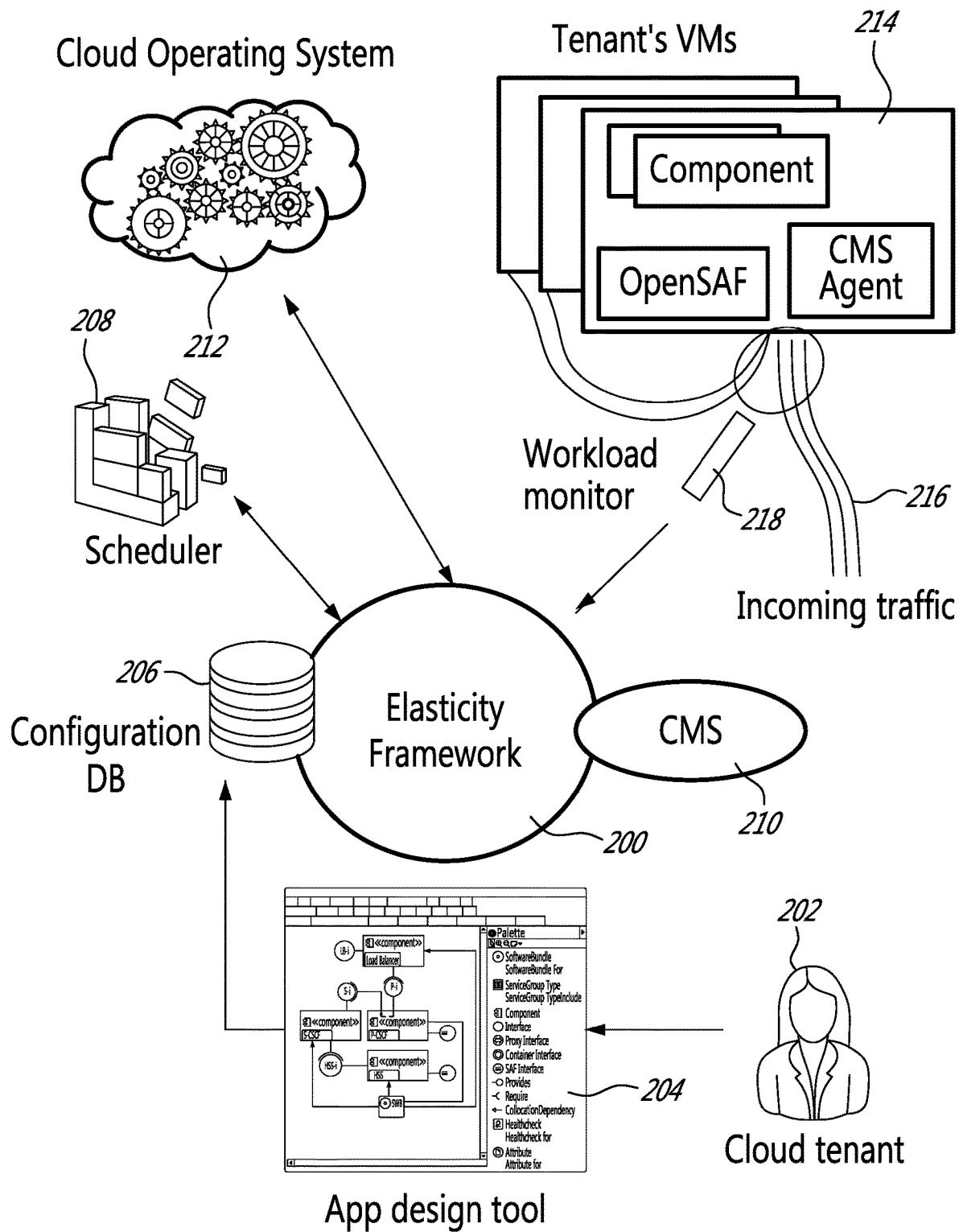
FIG. 2 illustrates an overview of an elasticity framework.

FIG. 2 illustrates an overview of an example elasticity framework 200 architecture. A cloud tenant 202 can input an application description via an application design tool 204 to be stored in a configuration database 206. A scheduler 208, in conjunction with the cloud manager system (CMS) 210 and cloud operating system (OS) 212, can place and instantiate the application components as virtual machines 214 hosted on servers in a data center. Each tenant VM 214 can include at least one application component as well as other optional functions such an OpenSAF agent and/or a CMS agent. Incoming traffic 216 can be served by the tenant VMs 214 while the workload is monitored 218 and reported to the CMS 210 as part of the elasticity framework 200.

In an application-centric approach, the user 202 can be enabled to embed the elasticity and HA requirements at the application specifications via the design interface 204. A domain-specific language based on the unified modelling language (UML) component diagram can be derived which allows the description of the application in terms of components and interfaces. A component can provide or require an interface from another component. In order to express the deployment and HA requirements of the application, the component diagram can be extended with more interfaces (e.g. the proxy interface) and dependencies (e.g. colocation dependencies. The specification of HA specific requirements is also allowed, such as the redundancy models and the number of replicas of a given component. This high-level information can later be transformed into a middleware specific language (based on the extensible markup language) known as the IMM configuration and serve as guidelines for the HA middleware to instantiate, monitor and react to failures.

Figure 3:
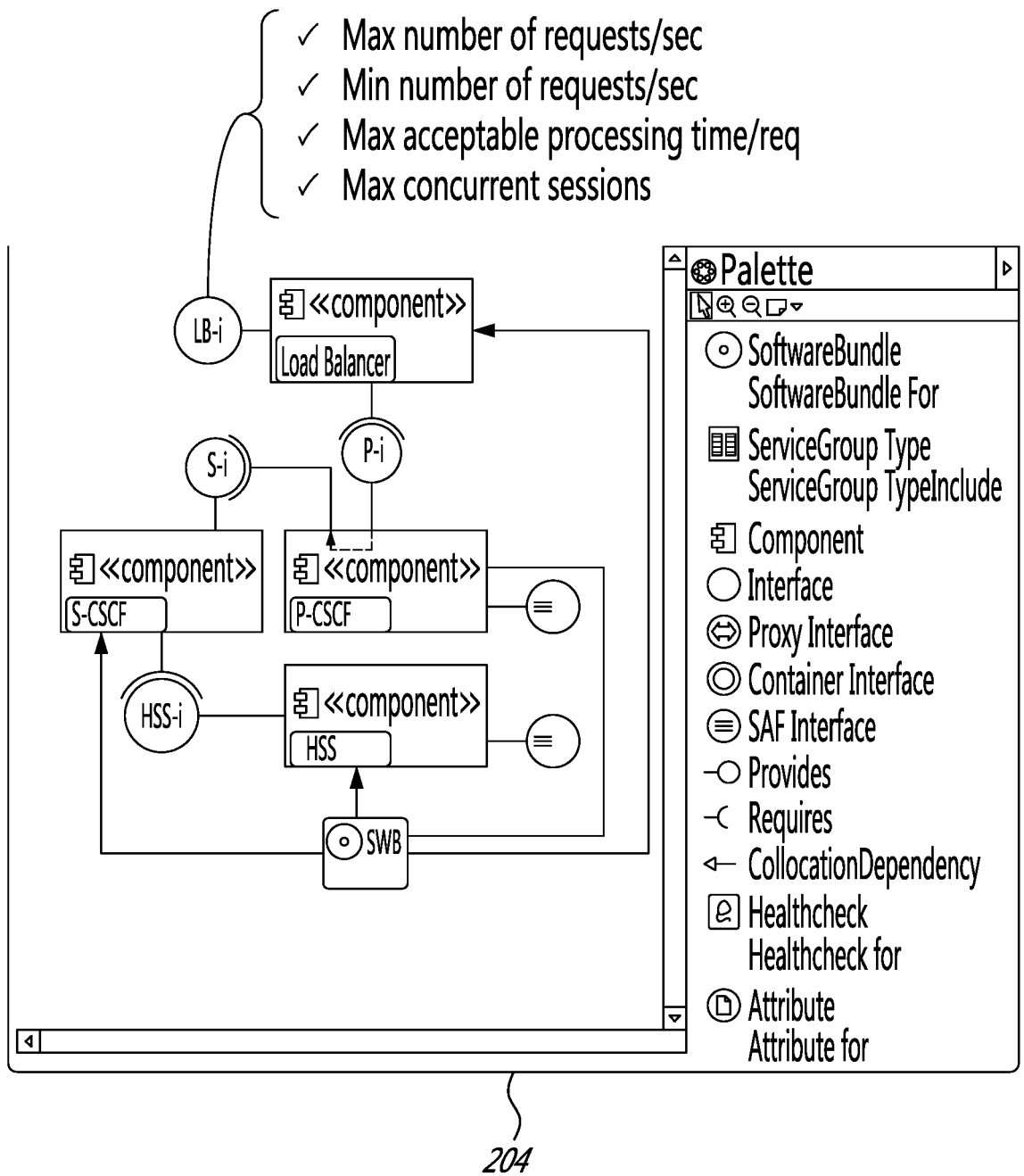
FIG. 3 illustrates an application description interface.

The UML based language can be further extended to enable the specifications of elasticity attributes at the design interface 204 level as further shown in FIG. 3. The values of these attributes are extracted by the elasticity framework and used to configure the monitoring and telemetry components in order to trigger the proper elasticity action. Moreover, the collocation and other forms of dependencies dictate which components should be installed in the same VMs, and the number of needed VMs. The next step would be to schedule the VMs for placement.

Figure 4:
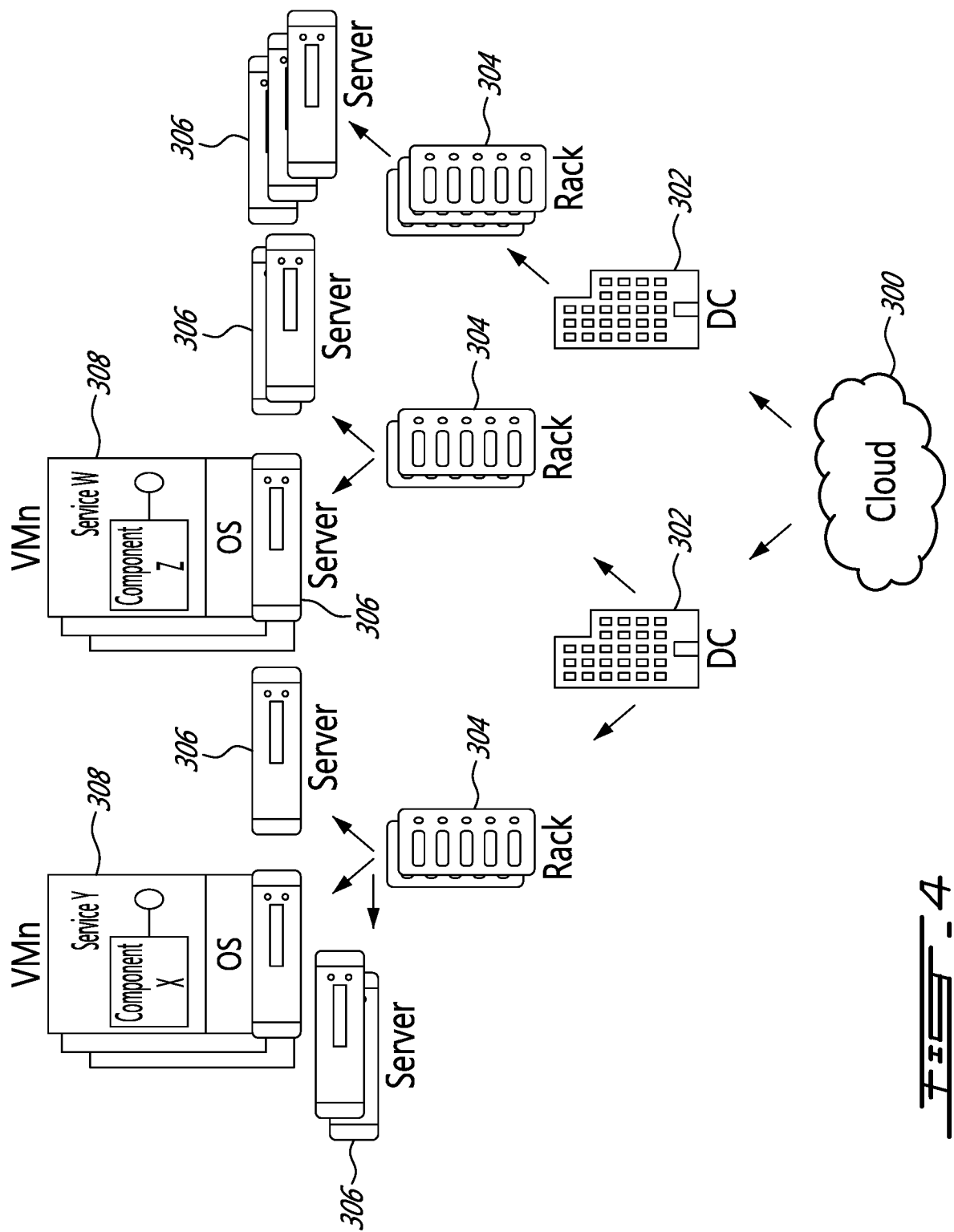
FIG. 4 is an architectural overview of a cloud network.

The cloud infrastructure can be viewed from a hierarchical perspective as an aggregation of several data centers each hosting a set of racks, composed of servers where the VMs are placed. FIG. 4 is an architectural overview of a cloud network illustrating an example hierarchy of such a cloud computing environment. The cloud network 300 can include a number of different data centers 302 which can be located at different geographic sites. Each data center site 302 can comprise a number of racks 304, each of which comprises a number of servers 306. A server 306 can be selected to host a VM 308 for running a component of an application as has been described herein. In the example of FIG. 4, VMn 308 runs Component X of Service Y and VMm 308 runs Component Z of Service W.

Figure 5:
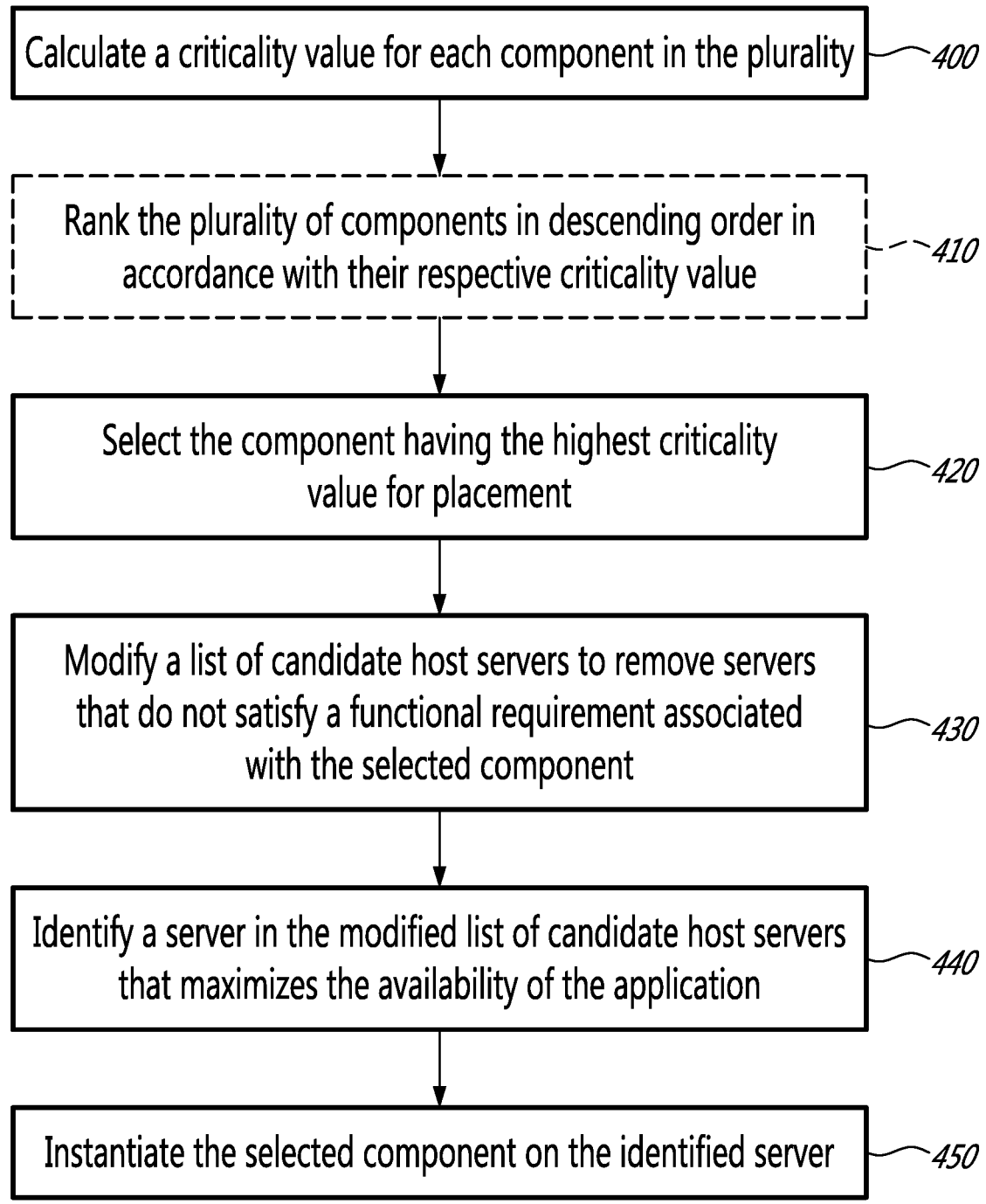
FIG. 5 is a flow chart illustrating a method for determining the placement of an application.

Various techniques can be used for HA-aware scheduling to determine an initial placement of the VMs that are hosting inter-dependent components of an application to optimize the availability of the application. FIG. 5 is a flow chart illustrating one example method for determining the initial placement of an application comprising a plurality of components onto one or more host servers. This exemplary method can be implemented by a cloud manager or scheduling entity. The set of components that compose the application can encompass a number of different component types. Dependencies between the components and/or component types can also be defined.

The method begins by calculating a criticality value for each component in the plurality (block 400). The criticality value indicates the relative impact that a failure of the component would have on the overall application. A component's criticality value can be calculated in accordance with a recovery time associated with the component and/or a failure rate associated with the component. The criticality value can also be based on comparing the recovery time of the component with an outage tolerance of another component that has a dependency on the given component. The criticality value can be calculated in accordance with a degradation value that can be based on a minimum outage tolerance of all of dependent components. In some embodiments, the criticality value can be calculated in accordance with the number of active instances of a component type associated with the component that exist in the application.

Optionally, the plurality of components in the application can be ranked in accordance with their respective criticality values (block 410). In some embodiments, the components are ranked in descending order of criticality. The component having the highest calculated criticality value is selected for placement (block 420). In some embodiments, a component will be removed from the ranked list of components once it has been placed.

A list of candidate servers for hosting the application components can be compiled and maintained. The list of candidate servers is modified to remove any servers that do not satisfy a functional requirement of the selected component (block 430). The functional requirement can include a capacity requirement and/or connectivity (e.g. delay) requirement associated with the selected component.

A server is identified and selected (block 440) from the modified list of candidate servers to host the selected component that will maximize the availability of the application. The server identification can be determined in accordance with a mean time to failure (MTTF) parameter and/or a mean time to recovery (MTTR) parameter associated with the server. In some embodiments, the server with the highest MTTF on the list of candidates can be selected. In some embodiments, the server with lowest MTTR on the list of candidates can be selected. In other embodiments, both the MTTF and MTTR, and other parameters can be used to identify a server in the list of candidate servers. A host can be considered to maximize the availability of the application if it minimizes the impact that its potential failure (e.g. failure of the hosted selected component) will have on the application.

In some embodiments, the list of candidate servers can be further modified prior to identify the server to host the selected component in block 440. Optionally, the list of candidate host servers can be modified in response to determining that the selected component must be co-located with a second component in the plurality. In such a case, the list of candidate servers can be modified to include only servers capable of hosting both the selected component and the second component. Optionally, the list of candidate host servers can be modified in response to determining that the selected component cannot be co-located with a second component in the plurality. In this case, a server can be removed from the candidate list if it hosts such a second component. This can include a redundancy relationship between the selected component and the second component indicating that the components cannot be co-located on the same host server.

The selected component is then instantiated on the identified server (block 450). This step can include sending instructions for the component to be instantiated on the identified server. The instructions can be sent to the identified server or a hypervisor/virtualization manager associated with the identified server. The component can be instantiated in response to such instructions.

In some optional embodiments, steps 420 through 450 can be repeated iteratively until all components of the application have been placed on host servers. The component with the next highest criticality value can be subsequently selected for placement. The list of candidate servers can be refined after each iteration.

In some embodiments, the method of FIG. 5 can be extended to application comprising multiple component types and multiple instances of each of the component types. The placement procedure can further consider the dependencies between the various component types.

The HA-aware scheduling approach can be extended to include the concept of elastic scheduling. The elastic scheduling approach can consider three objectives: 1) Identifying the constraints; 2) Maximizing the availability; and 3) Optimizing the placement for performance and other factors.

In an embodiment of the present disclosure, identifying the constraints can include a number of sub-steps, including: a) identifying the minimum number of instances; b) identifying the anchors; and c) identifying the orbital area.

Identifying the minimum number of instances can include determining the number of instances of a given component type that need to be added or removed in response to a change in workload. This calculation can be based on the information provided by the application design phase.

Identifying the anchors for the components to be added or removed includes identifying any functional dependency that exists between different component types and different components of the same type. These dependencies can introduce a "distance" limitation between a component and its "anchor" component. For example, if an additional instance of a database is needed, it may be anchored by the other existing instances of the database that need to synchronize their state with one another, and also by any components that are dependent on the database. The distance metric can be used to identify a maximum logical network distance between components requiring communication with each other.

Identifying the orbital area includes defining an area where a newly added component can optimally be placed.

This area can be bounded by a distance metric, such as the delay tolerance, between the components. For example, when adding a new instance of a database, it should not be placed too far apart from its peers or its dependents. The same applies when removing an instance, where the scheduler should ensure that the dependents connected to that instance can re-establish the connection with the sponsor without violating any delay constraints.

Figure 6A:
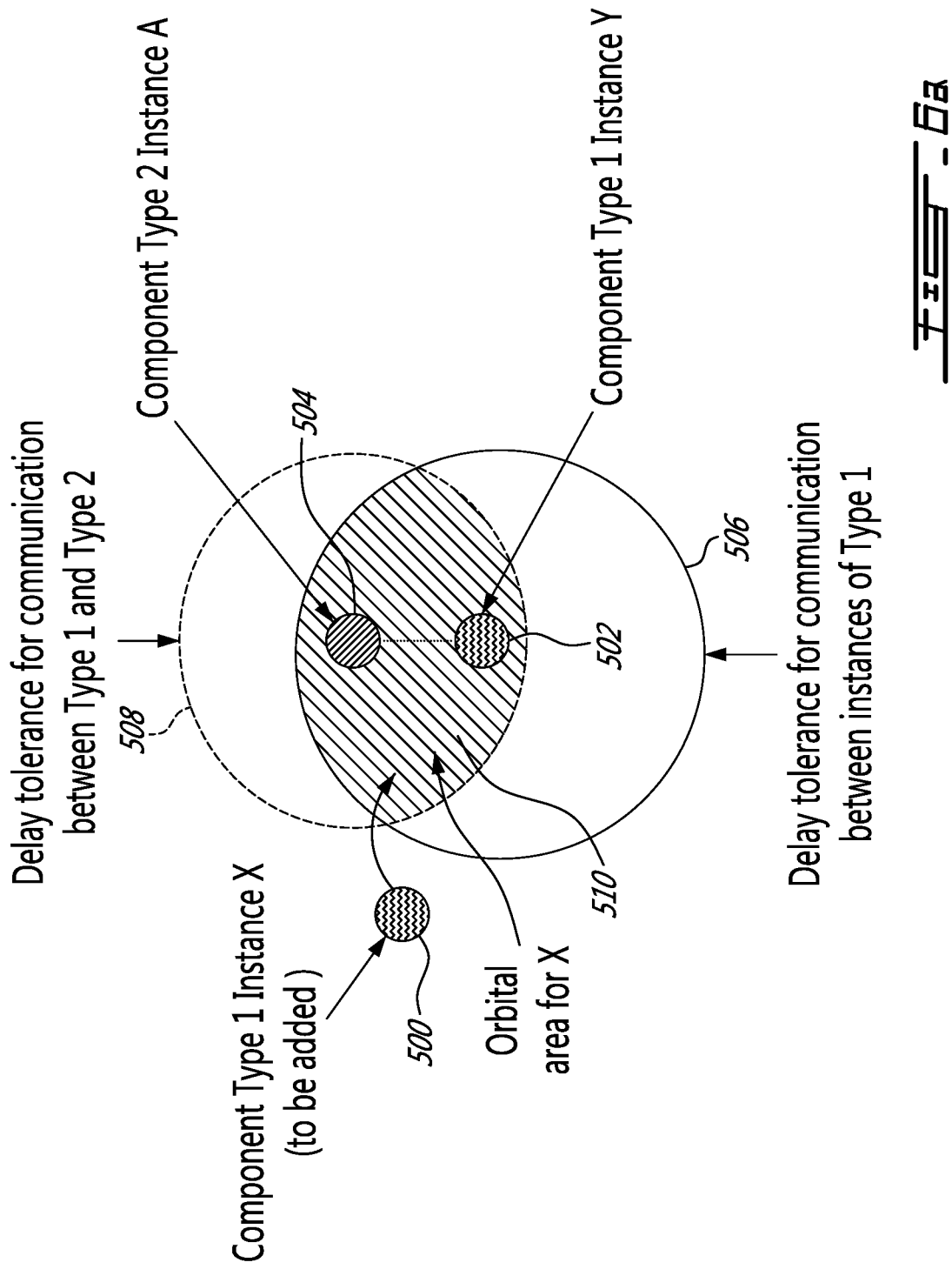
FIG. 6a is a block diagram illustrating component anchors and orbital area.
Figure 6B:
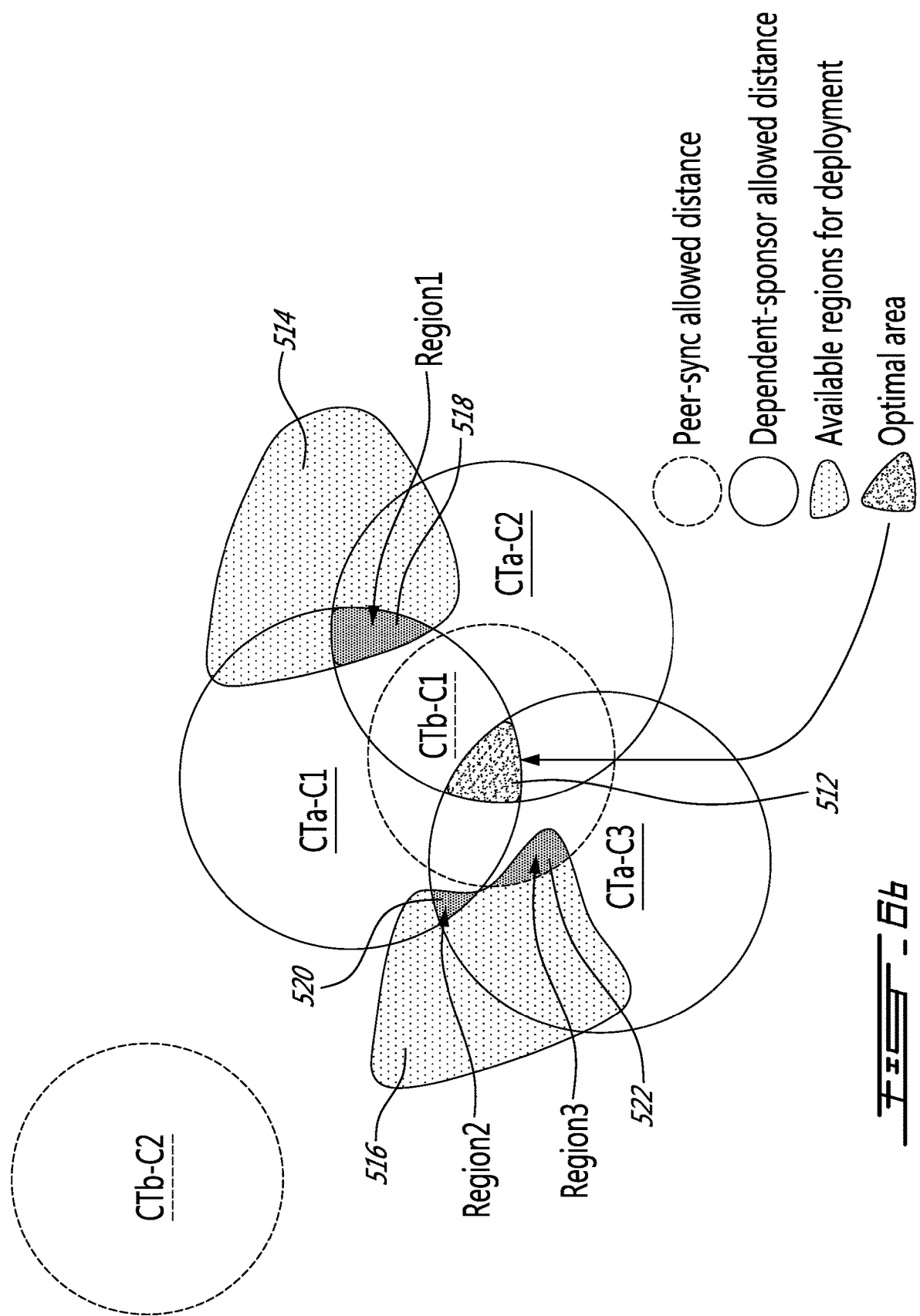
FIG. 6b is a block diagram illustrating component anchors and orbital area.

FIGS. 6a and 6b further illustrate the concept of the anchors and the orbital area. A given component can have multiple peer components and multiple dependent components, hence calculating the orbital area should consider all of these relationships. A distance metric can also be dependent on the cloud network specifics. It can be based on the number of hops (e.g. between switches/routers), the time to send a message between servers, or an availability zone which can consider the delay incurred by firewalls and load balancing, for example.

In the example of FIG. 6a, a new instance X 500 of component type 1 is to be added to an application. The already deployed application comprises instance Y 502 of component type 1 and instance A 504 of component type 2. In this exemplary application, component type 2 depends on component type 1. The delay tolerance for peer communication between instances of component type 1 is illustrated as area 506, while the delay tolerance for communication between dependent component types 1 and 2 is illustrated as area 508. The intersection between areas 506 and 508 can be defined as the optimal orbital area 510 for adding new component instance X 500. In other words, a server located in this orbital area 510 can be selected to host the new component instance X 500 and will satisfy the connectivity requirements for both communication between peer components and dependent components.

Those skilled in the art will appreciate that the determination of such an orbital area can become more complicated as more component types and instances are included in an application.

In the example of FIG. 6b, a deployed application consists of multiple instances of two different, dependent component types. Component type A has three instances: CTa-C1, CTa-C2, and CTa-C3. Component type B has one instance: CTb-C1. A new instance of component type B (CTb-C2) is to be added to the application. The distance metrics for peer communication and dependent-sponsor communication are illustrated for the deployed components. The optimal area 512 for deployment of the new component CTb-C2 is shown as the intersection of the distance metrics of the deployed components.

However, for this example it will be assumed that there is no available capacity for an additional component to be added in the determined optimal area 512. The available regions for deployment in the cloud network are illustrated as area 514 and area 516. Within the overall available regions 514 and 516, three potential optimal regions are identified—Region 1 518, Region 2 520, and Region 3 522. These three regions 518, 520, 522 provide maximum available intersection of the distance metrics of the deployed components. In such a scenario, additional factors can be considered when selecting a server to host component CTb-C2, to be added to the application.

The optimization of the placement for performance and other factors implies that the scheduler incorporates intelligence to consider other factors as well as HA. Examples of such factors can include: (1) considering the workload proximity, where the added components are placed in regions that are close to where a surge in the workload has occurred (e.g. if the surge is regional); and (2) considering data proximity, where the added components would be placed in close proximity to the data in case the application is data-driven where the computing components often communicate with databases or storage agents. Finally, there may be other factors that influence the placement such as a legal or business agreement forbidding the placement of the tenant's data in certain geographic regions. In practice, it is likely not feasible to have an HA-centric scheduler that is completely agnostic to other factors impacting the placement of the components.

In addition to the above, the cloud manager or scheduler can consider scoring or ranking the available regions for deployment as a part of its server selection process. This can include scenarios where the optimal area is not available for new component placements and also if there are multiple optimal areas available to choose from. Equation 1 considers calculating a Score for Region r with respect to component $C_x$ that is to be added to an application.

$$\text{Score}(r, C_x) = \left\lceil \frac{\#peers}{\#peers + 1} \right\rceil \times HAFactor + \sum_{i=1}^{\#Dependent\ \in r} (C_i \cdot \text{traffic} \times C_i \cdot \text{io\_ratio}) \quad \text{(Eq. 1)}$$

A ceiling function is used to determine if a High Availability Factor (HAFactor) will be included in the score. The HAFactor parameter represents the importance of having a replica of the component capable of handling its workload. The number of peer components (e.g. the number of components of the same type) for component $C_x$ is used in the ceiling function. $C_i$.traffic is a measure of the number of incoming requests (e.g. data traffic received by) dependent component $C_i$. $C_i$.io_ratio is the ratio of outgoing requests (e.g. data traffic sent by) dependent component $C_i$ to its sponsor component per incoming request received. This is summed together for each dependent component $C_i$ in the region r.

In some embodiments, Equation 1 can be further extended to consider additional factors as shown in Equation 2.

$$\text{Score}(r, C_x) = \left\lceil \frac{\#peers}{\#peers + 1} \right\rceil \times \frac{HAFactor}{\#peers + 1} + \text{Max\_benefit} + \left[ \sum_{j=1}^{\#sponsor\ \in r} (C_j \cdot allowed_{traffic}) - (\text{Max\_benefit} \times C_x \cdot \text{io\_ratio}) \right] \quad \text{(Eq. 2)}$$

where $$\text{Max\_benefit} = \sum_{i=1}^{\#Dependent\ \in r} (C_i \cdot \text{traffic} \times C_i \cdot \text{io\_ratio}) \quad \text{(Eq. 3)}$$

and where, $$C_j \cdot allowed_{traffic} = C_j \cdot \text{Max}_{traffic} - C_j \cdot \text{Current}_{traffic} \quad \text{(Eq. 4)}$$

The Max_benefit parameter relates to the maximum effect of load balancing between components of the same type. The $C_j$.allowed$_{traffic}$ parameter further considers that a component $C_j$ has a maximum bandwidth for handling traffic, $C_j$.Max$_{traffic}$, and may already be handling some amount of traffic, $C_j$.Current$_{traffic}$. Thus, only a certain amount of additional traffic can be allowed. Equation 2 further considers that the added component belongs to a type that can be both a sponsor for some components and a dependent on other components. Hence, if a sponsoring component for the added component cannot handle all of the traffic that the new component will generate, this placement will be given a lower score.

In general, the scoring mechanisms attempt to minimize the cost of failure of a component by considering factors such as data proximity, workload proximity, unused capacity, etc. when selecting a server location. Depending on the application, workload and network specifics, it may be desirable to place a new component in a less "crowded" zone or link it to a less congested sponsor component, for example.

Additional considerations can be incorporated into selecting a server after the optimal area(s) has been determined, or alternatively, the sub-optimal areas have been scored if an optimal region is not available. First, the scheduler can filter out servers in the regions/areas that are not desired to be used for hosting the new component. Then it can select a server for placement that maximizes the overall availability of the application. Maximizing the availability of the application when scaling is similar to as described with respect to the initial placement of a component. This can be based on two main criteria: minimizing the frequency of failure and/or minimizing the impact of failure.

Minimizing the frequency of failure can be based on the MTTF of the software components, the VMs, hypervisors, the computing servers, the racks, the data center facility, and the inter/intra-data center connectivity. The scheduler can select the placement that will maximize the MTTF of the newly added components, and the average MTTF of the application.

Minimizing the impact of failure does not only depend on maximizing the MTTF, but also the scheduler can consider other factors. It can minimize the MTTR and favor lightly saturated (e.g. a particular data center or availability zone) zones over highly saturated zones. The MTTR can be determined by the outages caused due to failures.

As previously discussed, the deployment and removal of VMs and their components can entail changes in the infrastructure, platform and application from the tenant's perspective.

Infrastructure elasticity can be achieved with the help of the cloud operating system. The cloud operating system processes the requests from the elasticity framework to add/remove VMs for a particular tenant based on the recommendation of the scheduler. The cloud operating system will add/remove the VMs and handle their connectivity. The VMs are spawned from images that yield HA-enabled VMs. The HA-enabled VMs come equipped with an installation of the HA middleware that is neither configured nor instantiated, and with an agent of the configuration management system.

Platform elasticity, in the context of embodiments of the present disclosure, can entail the elasticity of the HA middleware, which is the dynamic addition and removal of the middleware cluster nodes inside a tenant's virtual DC. While the HA middleware, namely OpenSAF, is capable of the deployment/removal of the applications throughout the HA cluster, it is unable to install and configure itself on the newly added VMs. Nevertheless, the tenant application's component(s) rely on the middleware to manage their HA and potentially other aspects such as their reliable messaging. Therefore, it is important that the HA middleware cluster grows and shrinks in a synchronized manner with the tenants virtual DC. The CMS can be used to perform this task. The CMS handles the orchestration and deployment based on static manifests grouped into modules. The manifests can include the class definitions and declarations. A class declaration can contain the code to perform a given functionality. This code can be defined in a declarative way, which makes the CMS versatile and enables the platform independent management. For instance the manifest can include a class to ensure a given package is installed and instantiated.

This information can be read by a CMS master and then pushed to a CMS agent as a set of instruction to be performed. The agent can perform the needed action according to the environment where it is deployed. For instance, according to a given Linux distribution is can figure out how to fetch and deploy the package. If this distribution changes, the manifest can still remain the same. However, due to the static nature of this manifest, the CMS can be extended with more agents. These agents are needed to dynamically change the content of the manifest to reflect the changes in the system, such as the need to add or remove more instances of OpenSAF. Moreover, the OpenSAF cluster configuration is included in a specific OpenSAF IMM configuration file, when the HA cluster grows or shrink, this configuration file must be regenerated (or modified to reflect this change). Therefore, there is a need for another agent that acts as the OpenSAF configuration generator. Upon the generation of new configuration files, the CMS is called to replace the old ones. As a result, several agents can be defined to complement the CMS with the ability to dynamically scale up/down the HA middleware.

A request listener agent is an agent that listens to cluster node addition or removal requests. Once it gets the request, it analyzes whether the added node should be a controller or a payload. It then forwards this information to the configuration generation agent.

A configuration generation agent receives instructions from the request listener agent(s), and generates a new middleware configuration to reflect the needed change either by adding or removing the nodes description from the middleware configuration file.

A change applier agent can dynamically modify the manifest files to reflect the changes in the system to be enforced.

A change enforcer agent is configured to verify that the changes are applied by the agents across the VMs in a consistent manner.

Application Elasticity can be achieved with the SMF of the OpenSAF middleware. SMF is conceived for the runtime upgrade of HA applications. It requires an upgrade campaign file that serves as a roadmap for the upgrade. An upgrade can be performed in a single step or in a rolling manner where one node is upgraded after another. Once a request for an upgrade is issued, the upgrade campaign generator agent reads the information specified in the application design file, and accordingly generates an upgrade campaign that satisfies the requested change. This upgrade campaign is then forwarded to SMF to execute the upgrade.

FIG. 7 is a signaling diagram illustrating examples of interactions between the various elements in the elasticity framework. The process begins with the cloud tenant 202 providing a description of the HA application for placement (step 600). This description can be interpreted by the elasticity framework 200, which analyzes the required number of VMs and their deployment constraints (step 602). This information can be forwarded to the HA-aware scheduler 208 (step 604) that can determine and reply with VM placement information (step 606). The elasticity framework 200 then instructs the Cloud OS 212 to instantiate the HA-enabled VMs according to the placement recommendation provided by the scheduler (step 608). The Cloud OS 212 can optionally acknowledge the successful launch of the VMs (step 610). Once the VMs are instantiated, the elasticity framework 200 can create a HA middleware configuration, modify the manifests, and instruct the CMS 210 to deploy OpenSAF on these VMs (step 612). CMS 210 can optionally acknowledge the successful deployment of the HA middleware (step 614). HA middleware 616 represents an example deployed middleware on one of the launched VMs. Thereafter, the elasticity framework 200 can install and start monitoring the application's components (step 618). Optionally, HA middleware 616 acknowledge a component's successful installation (step 620). This completes the initial placement phase 622.

Following the initial placement of the VMs, the monitoring entity 218 will be instructed to report on events that can trigger an elasticity action (step 624). Once a threshold is violated (e.g. the workload exceeding its upper limit) that triggers new components to be instantiated on new VMs, the placement process will be repeated, except this time, the scheduler will be constrained by the initial placement.

Monitoring entity 218 can report to the elasticity framework 200 that a workload threshold has been exceeded (step 626). A new HA scheduling is requested (step 628) and received (step 630) from the scheduler 208. In the event at least one new VM is required, the elasticity framework 200 instructs the Cloud OS 212 to instantiate the new VM (step 632). The Cloud OS 212 can optionally acknowledge the successful launch of the new VM (step 634). The elasticity framework 200 requests deployment and configuration of HA middleware in the new VM (step 636). CMS 210 can optionally acknowledge the successful deployment of the HA middleware (step 638). Then the elasticity framework 200 can install and start monitoring the newly added component (step 640) and, optionally, receive an acknowledgement of the successful installation (step 642).

FIG. 8 is a flow chart illustrating a method for scaling a highly available application comprising at least one component. This exemplary method can be implemented by a cloud manager or scheduling entity.

The process begins by monitoring a workload associated with an application (block 700), the application being comprised of a plurality of component types, and each of the component types having at least one instance of the component deployed. During the monitoring of the application and/or its component, it can be determined if a workload threshold associated with the application and/or a component has been exceed (block 710). In some embodiments, this determination can be made in accordance with receiving a reporting message on a change in workload associated with the application.

In response to the workload monitoring, or the workload threshold being exceeded, it is determined that at least one component type requires an increased number of instances to be added to the application (block 720). Optionally, the method can further include determining the quantity of new instances of the component type that is required to be added (block 730). The quantity can be determined based on the monitored workload or a change in the workload.

In some embodiments, dependencies can be identified between the existing, already deployed components of the application and the at least one new component to be added. The dependencies can include delay tolerances between dependent component types, synchronization requirements between instances of the same components, and/or other functional parameters affecting the operation of the components or the overall application.

A first logical distance metric and a second logical distance metric are obtained (block 740). The first logical distance metric defines a maximum allowable network delay between instances of the first component type. The maximum allowable network delay between instances of the first component type can be based on a connectivity requirement that is specified for communication between two instances of the same component type. The second logical distance metric defines a maximum allowable network delay between an instance of the first component type and an instance of a second component type. The maximum allowable network delay between instances of the first component type and the second component type can be based on a connectivity requirement that is specified for communication between instances of the different component types. Examples of such connectivity requirements can include response time, delay or latency tolerance, synchronization time, number of network hops, speed or bandwidth of network links, etc.

In some embodiments, obtaining the distance metrics can include receiving the distance metrics from another network entity or retrieving the distance metrics from memory. In some embodiments, obtaining the distance metrics can include determining the distance metrics in accordance with the identified dependencies between the components. In some embodiments, obtaining the distance metrics can include calculating the distance metrics. The distance metrics can be calculated based on the connectivity requirements as described herein.

In some embodiments, the first logical distance metric and the second logical distance metric can be used to determine an orbital area defining a network region/zone/location where a server should be selected from to host the new component. The orbital area can be determined to satisfy the first and second logical distance metrics with respect to the new component and the existing deployed components of the application.

A server is selected for hosting the new instance of the component to be added (block 750). The server is selected in accordance with at least the first and second logical distance metrics. In some embodiments the server can be selected further in accordance with the identified dependencies between the components.

In some embodiments, the server can be selected further in accordance with maximizing the availability of the application. The host can be selected from a plurality of candidate host servers at different locations in a data center network. Maximizing the availability of the application can include minimizing the potential downtime by selecting a candidate server that will minimize the impact and/or frequency of a component's failure on the overall application. A server can be considered to maximize the availability of the application if it minimizes the impact that its potential failure (e.g. failure of the hosted selected component) will have on the application. The server can be selected in accordance with accordance with a number of optional requirements including a mean time to failure parameter associated with the server, a mean time to recovery parameter associated with the server, and others.

In some embodiments, a list of candidate servers for hosting the application components can be compiled and maintained. The list of candidate servers can be modified to remove any servers that do not satisfy the logical distance metrics, or any other functional requirements of the component to be added.

A new instance of the first component type is then instantiated at the selected server (block 760). The step of instantiating can optionally include transmitting instructions to the selected host server to instantiate a virtual machine and to launch the component.

It is noted that the method of FIG. 8 is directed to an embodiment for scaling up an application. Those skilled in the art will appreciate that similar techniques can be employed for scaling down an application in response to a change in workload or other factors.

Figure 9:
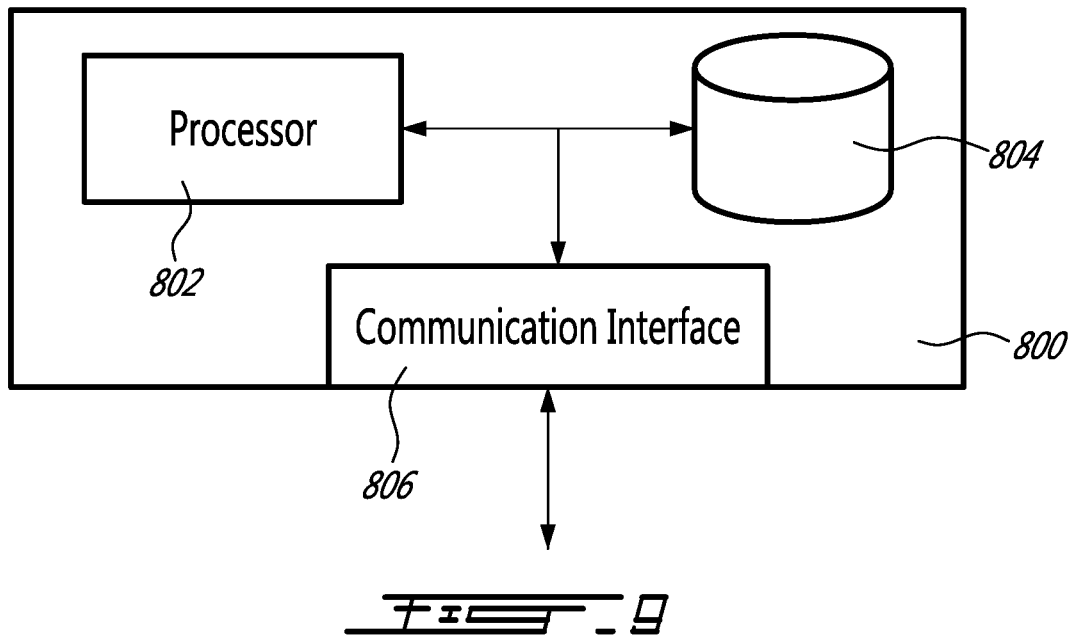
FIG. 9 is a block diagram illustrating an example network node.

FIG. 9 is a block diagram illustrating an example network node or element 800 according to embodiments of the present invention. Network element 800 can be a cloud manager or cloud scheduler device as have been described herein. The cloud manager 800 comprises circuitry including a processor 802, a memory or instruction repository 804 and a communication interface 806. The communication interface 806 can include at least one input port and at least one output port. The memory 804 contains instructions executable by the processor 802 whereby the cloud manager 800 is operable to perform the various embodiments as described herein. In some embodiments, the cloud manager 800 can be a virtualized application hosted by the underlying physical hardware.

Cloud manager 800 is operative to monitor a workload associated with an application comprising a plurality of component types and at least one deployed instance of each of the component types. Cloud manager 800 can determine that a first component type requires an increased number of instances. Cloud manager 800 is operative to obtain a first logical distance metric and a second logical distance metric as have been defined herein. A server can be selected in accordance with at least the first logical distance metric and the second logical distance metric and cloud manager 800 instantiates a new instance of the first component type on the selected server.

Figure 10:
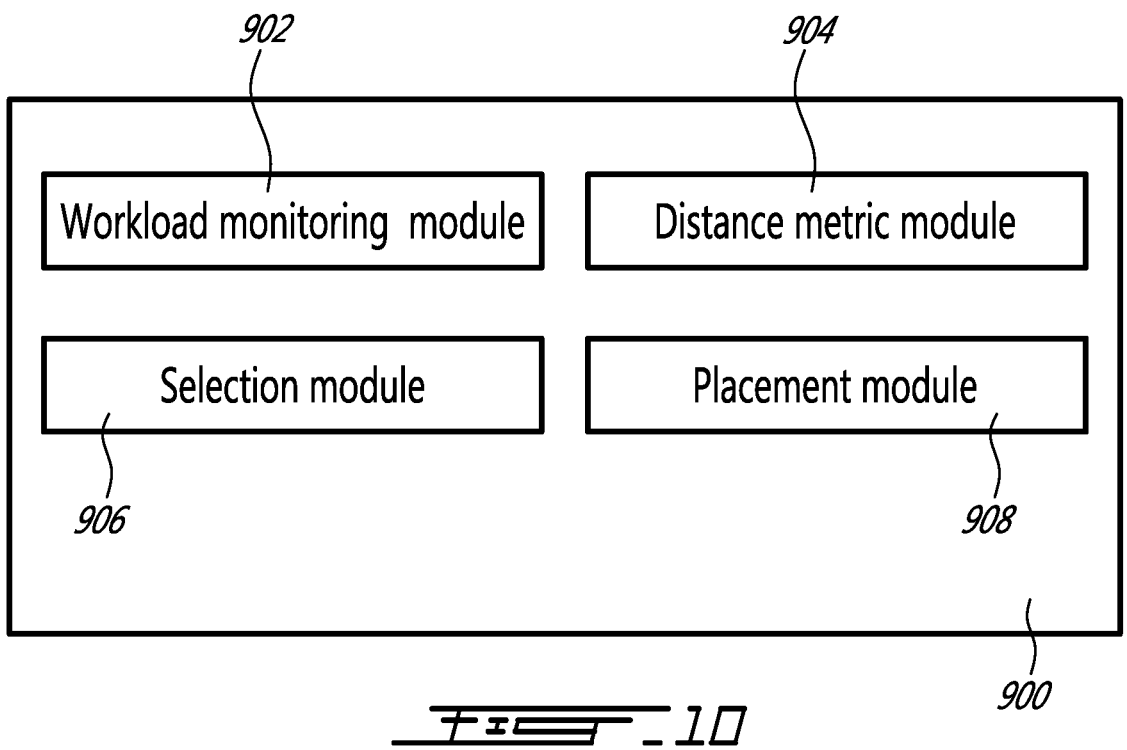
FIG. 10 is a block diagram of an example cloud manager node.

FIG. 10 is a block diagram of an example cloud manager node 900 or scheduler node 900 that can include a number of modules. Cloud manager 900 includes a workload monitoring module 902 for monitoring a workload associated with an application and for determining that a component of the application requires an increased number of instances. A distance metric module 904 is provided for obtaining a first logical distance metric defining a maximum allowable network delay between instances of the first component type and a second logical distance metric defining a maximum allowable network delay between an instance of the first component type and an instance of a second component type. A selection module 906 is provided for selecting a server to host the new component, and a placement module 908 is provided for instantiating the new component on the selected host. Cloud manager 900 can be configured to perform the various embodiments as have been described herein.

The unexpected outage of cloud services has a great impact on business continuity and IT enterprises. One method for achieving these requirements is to develop an approach that is immune to failure while considering real-time interdependencies and redundancies between applications. Attaining an always-on and always-available application is an objective of the described HA scheduler by generating a highly-available optimal placement for the requested applications. Those skilled in the art will appreciate that the proposed systems and methods can be extended to include multiple objectives, such as maximizing the HA of applications' components and maximizing resource utilization of the used infrastructure.

Elasticity is a characteristic of cloud computing where the provisioning of resources can be directly proportional to the run-time demand. Highly available applications typically rely on the underlying platform to manage their availability by monitoring heartbeats, executing recoveries, and attempting repairs to bring the system back to normal. Elasticity policies that target only the application without considering the other factors contributing to its high availability may hinder the quality of service and even violate the service level agreement.

Embodiments of the invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for scaling an application, the method comprising:
    monitoring a workload associated with an application, the application comprising a plurality of component types and at least one deployed instance of each of the component types, the application combining functionality of the component types to provide a service;
    determining that an instance of a first component type requires an increased number of instances;
    identifying dependencies between the deployed instances of each of the component types and a new instance of the first component type to be added;
    obtaining a first logical distance metric defining a maximum allowable network delay between instances of the first component type and a second logical distance metric defining a maximum allowable network delay between the instance of the first component type and an instance of a second component type, wherein the instance of the second component type is dependent on the instance of the first component type;
    determining a network zone for server selection in accordance with the first logical distance metric and the second logical distance metric;
    selecting a server from a list of candidate servers at different locations in accordance with the network zone; and
    instantiating the new instance of the first component type on the selected server.

2. The method of claim 1, wherein determining that the instance of the first component type requires the increased number of instances is responsive to determining that a workload threshold has been exceeded.

3. The method of claim 1, further comprising, determining a quantity of instances of the first component type to be added in accordance with the monitored workload.

4. The method of claim 1, wherein the maximum allowable network delay between instances of the first component type is determined at least in part based on a connectivity requirement between instances of components of a same type.

5. The method of claim 1, wherein the maximum allowable network delay between the instance of the first component type and the instance of the second component type is determined at least in part based on a connectivity requirement between instances of components of different types.

6. The method of claim 1, further comprising, selecting the server further in accordance with maximizing an availability of the application.

7. The method of claim 6, wherein maximizing the availability of the application includes at least one of minimizing a frequency of failure of the application and minimizing an impact of failure on the application.

8. The method of claim 6, wherein the server is selected in accordance with at least one of a mean time to failure parameter associated with the server and a mean time to recovery parameter associated with the server.

9. A cloud manager comprising circuitry including a processor and a memory, the memory containing instructions executed by the processor to:
monitor a workload associated with an application, the application comprising a plurality of component types and at least one deployed instance of each of the component types, the application combining functionality of the component types to provide a service;
determine that an instance of a first component type requires an increased number of instances;
identify dependencies between the deployed instances of each of the component types and a new instance of the first component type to be added;
obtain a first logical distance metric defining a maximum allowable network delay between instances of the first component type and a second logical distance metric defining a maximum allowable network delay between the instance of the first component type and an instance of a second component type, wherein the instance of the second component type is dependent on the instance of the first component type;
determine a network zone for server selection in accordance with the first logical distance metric and the second logical distance metric;
select a server from a list of candidate servers at different locations in accordance with the network zone; and
instantiate the new instance of the first component type on the selected server.

10. The cloud manager of claim 9, wherein determining that the instance of the first component type requires the increased number of instances is responsive to determining that a workload threshold has been exceeded.

11. The cloud manager of claim 9, further operative to determine a quantity of instances of the first component type to be added in accordance with the monitored workload.

12. The cloud manager of claim 9, wherein the maximum allowable network delay between instances of the first component type is determined at least in part based on a connectivity requirement between instances of components of a same type.

13. The cloud manager of claim 9, wherein the maximum allowable network delay between the instance of the first component type and the instance of the second component is determined at least in part based on a connectivity requirement between instances of components of different types.

14. The cloud manager of claim 9, further operative to select the server further in accordance with maximizing an availability of the application.

15. The cloud manager of claim 14, wherein maximizing the availability of the application includes at least one of minimizing a frequency of failure of the application and minimizing an impact of failure on the application.

16. The cloud manager of claim 14, wherein the server is selected in accordance with at least one of a mean time to failure parameter associated with the server and a mean time to recovery parameter associated with the server.

17. A non-transitory computer readable storage medium storing executable instructions executed by a processor to:
monitor a workload associated with an application, the application comprising a plurality of component types and at least one deployed instance of each of the component types, the application combining functionality of the component types to provide a service;
determine that an instance of a first component type requires an increased number of instances;
identify dependencies between the deployed instances of each of the component types and a new instance of the first component type to be added;
obtain a first logical distance metric defining a maximum allowable network delay between instances of the first component type and a second logical distance metric defining a maximum allowable network delay between the instance of the first component type and an instance of a second component type, wherein the instance of the second component type is dependent on the instance of the first component type;
determine a network zone for server selection in accordance with the first logical distance metric and the second logical distance metric;
select a server from a list of candidate servers at different locations in accordance with the network zone; and
instantiate the new instance of the first component type on the selected server.

* * * * *